(12) United States Patent
Engelhardt et al.

(10) Patent No.: US 8,532,875 B2
(45) Date of Patent: Sep. 10, 2013

(54) MOTOR VEHICLE HAVING A RIDE HEIGHT CONTROL SYSTEM

(75) Inventors: Marek Engelhardt, Friedewald (DE); Dierk Hein, Wedemark (DE)

(73) Assignee: Continental Teves AG & Co. oHG (DE)

( * ) Notice: Subject to any disclaimer, the term of this patent is extended or adjusted under 35 U.S.C. 154(b) by 79 days.

(21) Appl. No.: 13/259,556

(22) PCT Filed: Dec. 15, 2009

(86) PCT No.: PCT/EP2009/067164
§ 371 (c)(1),
(2), (4) Date: Sep. 23, 2011

(87) PCT Pub. No.: WO2010/108557
PCT Pub. Date: Sep. 30, 2010

(65) Prior Publication Data
US 2012/0041642 A1    Feb. 16, 2012

(30) Foreign Application Priority Data

Mar. 27, 2009   (DE) .................. 10 2009 003 686

(51) Int. Cl.
*B60G 17/016*   (2006.01)
*B60G 17/052*   (2006.01)
(52) U.S. Cl.
CPC ...... *B60G 17/0523* (2013.01); *B60G 2400/202* (2013.01); *B60G 2400/70* (2013.01); *B60G 2500/2014* (2013.01); *B60G 2500/205* (2013.01)
USPC ............................ 701/39; 701/37

(58) Field of Classification Search
CPC .......... B60G 17/0523; B60G 17/0525; B60G 2400/204; B60G 2400/70; B60G 2500/2014; B60G 2500/205; B60G 2600/02
USPC .................................... 701/37, 39
See application file for complete search history.

(56) References Cited

U.S. PATENT DOCUMENTS

| 6,171,065 | B1 | 1/2001 | Wode |
| 6,212,451 | B1 * | 4/2001 | Kutscher et al. ............... 701/37 |
| 6,799,950 | B2 * | 10/2004 | Meier et al. .................... 417/12 |
| 8,152,475 | B2 * | 4/2012 | Sorge .............................. 417/32 |
| 8,326,488 | B2 * | 12/2012 | Onuma et al. .................. 701/38 |

(Continued)

FOREIGN PATENT DOCUMENTS

| DE | 19621946 C1 | 9/1997 |
| DE | 19810764 A1 | 9/1999 |

(Continued)

OTHER PUBLICATIONS

International Search Report issued in PCT/EP2009/067164 filed Dec. 15, 2009, mailed Mar. 12, 2010.

*Primary Examiner* — James Trammel
*Assistant Examiner* — Todd Melton
(74) *Attorney, Agent, or Firm* — RatnerPrestia

(57) ABSTRACT

Motor vehicle having a closed ride height control system which contains a control unit in which a switch-off limiting value for at least one operating parameter of at least one component of the ride height control system is monitored, wherein in raising processes the activation of the component is prohibited or aborted when the switch-off limiting value is reached, and upward transgression of the switch-off limiting value of the operating parameter is permitted in the case of lowering processes.

12 Claims, 4 Drawing Sheets

(56) References Cited

U.S. PATENT DOCUMENTS

| | | |
|---|---|---|
| 2002/0136645 A1 | 9/2002 | Folchert |
| 2002/0187048 A1 | 12/2002 | Meier |
| 2007/0040344 A1 | 2/2007 | Stiller |
| 2007/0068182 A1 | 3/2007 | Folchert |
| 2009/0082922 A1 | 3/2009 | Stiller |

FOREIGN PATENT DOCUMENTS

| | | |
|---|---|---|
| DE | 10120206 A1 | 10/2002 |
| DE | 10331600 A1 | 2/2005 |
| DE | 10354491 A1 | 6/2005 |
| DE | 102005018434 A1 | 10/2006 |
| DE | 102006039538 A1 | 3/2008 |
| EP | 1243447 A2 | 9/2002 |

\* cited by examiner

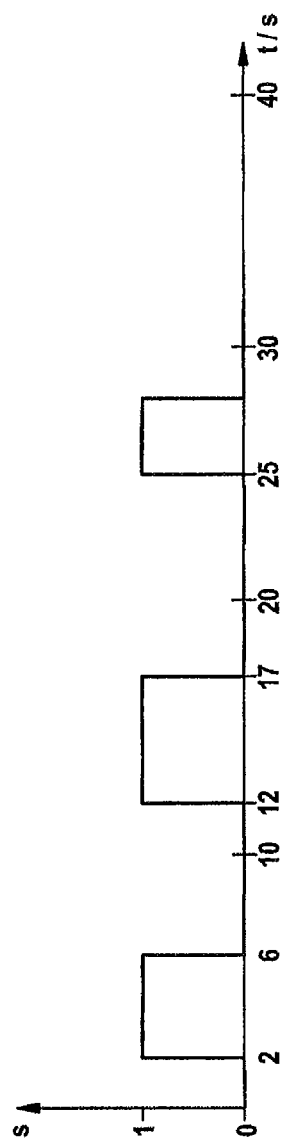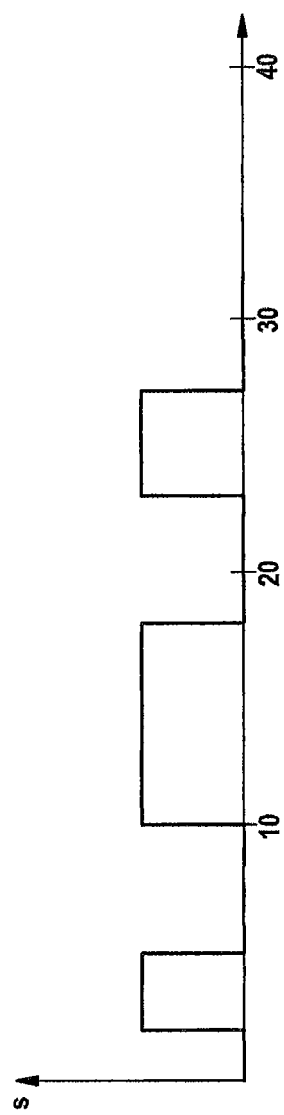

MOTOR VEHICLE HAVING A RIDE HEIGHT CONTROL SYSTEM

CROSS REFERENCE TO RELATED APPLICATIONS

This application is the U.S. National Phase Application of PCT International Application No. PCT/EP2009/067164, filed Dec. 15, 2009, which claims priority to German Patent Application No. 10 2009 003 686.5, filed Mar. 27, 2009, the contents of such applications being incorporated by reference herein.

FIELD OF THE INVENTION

The invention relates to a motor vehicle having a ride height control system which contains the following components:
air springs,
at least one compressed air accumulator,
compressed air lines with switchable directional control valves, with which the compressed air lines can be closed or opened,
a compressor with which compressed air can be transferred from the compressed air accumulator into the air springs via compressed air lines for a raising process and with which compressed air can be transferred from the air springs into the compressed air accumulator via compressed air lines for a lowering process,
a control unit in which a switch-off limiting value for at least one operating parameter of at least one component of the ride height control system is monitored, wherein the activation of the component is prohibited or aborted when the switch-off limiting value is reached.

BACKGROUND OF THE INVENTION

A ride height control system for a motor vehicle, in which, in order to control the ride height of the vehicle body, compressed air is pumped to and fro between an accumulator and the air springs using a compressor has been known for a long time from the prior art, for example EP 1 243 447 A2, which is incorporated by reference, and is referred to as a closed ride height control system. In a close ride height control system the air springs are emptied into the accumulator in order to lower the vehicle body, whereas in the case of an open ride height control system the air springs are entered into the atmosphere in order to lower the vehicle body. A closed ride height control system has the advantage over an open ride height control system that rapid raising and lowering of the vehicle body is possible with little expenditure of energy.

A ride height control system has different components for which specific operating parameters have to be complied with for these components not to be damaged. It is therefore possible, in particular, for the compressor and the switchable directional control valves a of a ride height control system to be damaged by excessively high temperatures. It is therefore already known from the prior art to monitor the "compressor temperature" operating parameter and to introduce a switch-off limiting value for this operating parameter. The compressor of the ride height control system is switched off if the compressor temperature reaches the switch-off limiting value, with the result that damage to the compressor is reliably prevented. However, it is to be noted that switching off the sensitive components of the ride height control system when the respective switch-off limiting value is reached either leads to aborting of a current control process or to prohibition of a respective control process in the ride height control system. However, there are control processes which absolutely have to be carried out for safety reasons. In particular, in a motor vehicle with a ride height control system it must always be possible to lower the vehicle body. It can therefore be necessary, for example, to lower the vehicle body from a high height in order to lower the vehicle body to a height which is safe in terms of vehicle movement dynamics or in order to ensure good pedestrian protection in the case of a collision between a motor vehicle and a pedestrian. This is not ensured, for example, if the vehicle body has been raised to the high height shortly before it is lowered using the ride height control system and in this context the operating parameter of a component of the ride height control system has reached the switch-off limit. In this case, the subsequent lowering of the vehicle body would be prohibited. Sufficient lowering of the vehicle body is also not ensured when the lowering process is interrupted prematurely because during the lowering process the operating parameter of a component of the ride height control system reaches the switch-off limit.

DE 19810764 A1, which is incorporated by reference, proposes in this context to operate the compressor in a clocked fashion from the time when the switch-off limiting value for the compressor temperature is reached, with the result that during the clocked operation the compressor does not heat up further and is not damaged. However, it is to be noted that the desired rapid lowering of the vehicle body by emptying the air springs into the compressed air accumulator of the ride height control system is not possible using clocked operation of the compressor.

SUMMARY OF THE INVENTION

The invention relates to a motor vehicle with a closed ride height control system with which it is always possible to lower the vehicle body by emptying the air springs.

According to one aspect of the invention, a motor vehicle having a ride height control system contains the following components:
air springs, at least one compressed air accumulator,
compressed air lines with switchable directional control valves, with which the compressed air lines can be closed or opened,
a compressor with which compressed air can be transferred from the compressed air accumulator into the air springs via compressed air lines for a raising process and with which compressed air can be transferred from the air springs into the compressed air accumulator via compressed air lines for a lowering process,
a control unit in which a switch-off limiting value for at least one operating parameter of at least one component of the ride height control system is monitored, wherein the activation of the component is prohibited or aborted when the switch-off limiting value is reached,
wherein in raising processes the activation of the component is prohibited or aborted when the switch-off limiting value is reached, and upward transgression of the switch-off limiting value of the operating parameter is permitted in the case of lowering processes. In raising processes the activation of the component is prohibited or aborted when the switch-off limiting value is reached, and that upward transgression of the switch-off limiting value of the operating parameter is permitted in the case of lowering processes.

An advantage of the invention is to be seen in the fact that a rapid lowering process is always possible in the ride height control system, and therefore rapid lowering of the vehicle body of the motor vehicle is always possible. A further advantage of the invention is to be seen in the fact that the compressed air is retained in the closed ride height control system since even in the case of lowering processes in which the switch-off limit of at least one operating parameter is exceeded the compressed air is transferred from the air springs into the compressed air accumulator of the ride height control system using the compressor. Later refilling of the ride height control system from the atmosphere, such as would be necessary if the air springs were to be emptied into the atmosphere for rapid lowering of the vehicle body, is therefore eliminated. A further advantage of the invention is to be seen in the fact that the components of the ride height control system are well protected against damage since the switch-off limiting values in the case of raising processes are always complied with and are only exceeded in the case of lowering processes.

According to one development in the invention, the switchable directional control valves and the compressor are each assigned at least one operating parameter, and upward transgression of the respective switch-off limiting value of all the operating parameters is permitted in the case of lowering processes. The advantage of this development is to be seen in the fact that the particularly sensitive components of the ride height control system, specifically the switchable directional control valves and the compressor, are effectively protected against damage and nevertheless rapid lowering processes are possible using the ride height control system.

According to one development of the invention, each switchable directional control valve is assigned its switch-on period as an operating parameter. The switch-on period of a directional control valve has a direct relationship to the temperature within the directional control valve, which temperature has to be monitored in order to prevent damage to the directional control valve. The advantage of the development is therefore to be seen in the fact that the monitoring of the switch-on period of the directional control valve permits indirect monitoring of the temperature in the directional control valve. A further advantage of the development is to be seen in the fact that the switch-on period of a switchable directional control valve can be easily monitored.

One development of the invention is characterized in that the switch-on period of a switchable directional control valve is monitored in the control unit as follows:
  a time interval of a specific length is defined,
  the switch-on period during which the switchable directional control valve is switched on in the preceding time interval is monitored,
  the switchable directional control valve is basically switched off when the switch-on period reaches a defined switch-off limiting value within the last preceding time interval,
  renewed switching on of the directional control valve is not permitted again until the switch-on period in the last preceding time interval reaches a switch-on limiting value which is lower than the switch-off limiting value, wherein during a lowering process the control unit permits the time period in the last preceding time interval to be exceeded, and in order to initiate a lowering process after the directional control valve has switched off, the control unit permits renewed switching on of the directional control valve even when the switch-on limiting value has not yet been reached.

An advantage of this development is to be seen in the fact that continuous switching on and off of the switchable directional control valve is avoided since in the case of raising processes renewed switching on of the directional control valve after the switch-off limiting value has been reached is not permitted again until the switch-on limiting value is reached. The difference between the two limiting values is therefore available as a new switch-on period. A further advantage of the development is to be seen in the fact that rapid lowering processes are always possible in the ride height control system.

According to one development of the invention, the compressor is assigned the compressor temperature as an operating parameter. The compressor temperature can be monitored using a temperature sensor or using a suitable compressor temperature model, as are known from the prior art. The advantage of the development is to be seen in the fact that the compressor can be particularly well protected against damage by monitoring the compressor temperature.

According to one development of the invention, the compressor is assigned the ambient temperature of the compressor as an operating parameter. In modern motor vehicles it may be the case that the compressor is installed at a location at which there are particularly high ambient temperatures, for example in the vicinity of the engine block. The advantage of the development is to be seen in the fact that even in these cases damage to the compressor is reliably prevented by the monitoring of the ambient temperature of the compressor.

According to one development of the invention, a safety height for the vehicle body of the motor vehicle is defined in the control unit, wherein during a lowering process upward transgression of the respective switch-off limiting value of the operating parameters is permitted only when the current height of the vehicle body is above the safety height. The safety height can be defined, for example, in the control unit, in such a way that the vehicle body of the motor vehicle is in a state which is safe in terms of vehicle movement dynamics at the safety height. The safety height can alternatively be defined in the control unit in such a way that particularly good pedestrian protection is possible if the vehicle body of a motor vehicle is at the safety height. The advantage of the development is to be seen in the fact that upward transgression of the respective switch-off limiting values of the operating parameters is not permitted in all lowering processes but rather only in specific lowering process. The number of lowering processes during which upward transgression of the switch-off limiting values is permitted is therefore reduced and damage to the sensitive components of the ride height control system is prevented in an even better way.

According to one development of the invention, upper transgression of the respective switch-off limiting value of the operating parameters is permitted only when the safety height of the vehicle body is to be set with a lowering process. In contrast, upward transgression of the respective limiting values of the operating parameters is not permitted for all lowering processes which are intended to end above the safety height since in these cases the safety height is not required. The advantage of this development is to be seen in the fact that the number of lowering processes during which upward transgression of the switch-off limiting values of the operating parameters is permitted is reduced once more. Damage to the sensitive components of the ride height control system is therefore prevented particularly well.

According to one development of the invention, a limiting speed for the motor vehicle is defined in the control unit, wherein upward transgression of the respective switch-off limiting values of the operating parameters is permitted only when the current speed of the motor vehicle exceeds the limiting speed. As long as the speed for the motor vehicle is below the limiting speed, it is not necessary to lower the vehicle body to a safety height. The advantage of the development is to be seen in the fact that the number of lowering processes during which upward transgression of the switch-off limiting values of the operating parameters is permitted is reduced once more.

According to one development of the invention, in addition to the associated switch-off limiting value, a maximum limiting value, which is higher than the respective switch-off limiting value, is defined for each operating parameter, wherein a lowering process is interrupted if the maximum limiting value of at least one operating parameter is reached. As a result of the development it is ensured that the operating parameters of the sensitive components of the ride height control system do not increase too greatly. In this context, the maximum limiting values are defined in such a way that the sensitive components of the ride height control system can be operated a few times up to these maximum limiting values without damage. The advantage of the development is to be seen in the fact that damage to the sensitive components of the ride height control system is reliably prevented even if the switch-off limiting values are exceeded frequently.

According to one development of the invention, a renewed lowering process or continuation of an aborted lowering process is not permitted again until all the operating parameters have undershot the first switch-off limiting value'again. The advantage of this development is to be seen in the fact that continuous switching on and off of the sensitive components of the ride height control system is avoided.

According to one development of the invention the air springs are emptied into the atmosphere via an atmospheric outlet when the lowering process is interrupted. The advantage of this development is to be seen in the fact that a rapid lowering process is possible in the ride height control system even if the compressor of the ride height control system can no longer be operated without being damaged.

BRIEF DESCRIPTION OF THE DRAWINGS

The invention is best understood from the following detailed description when read in connection with the accompanying drawings. Included in the drawings is the following figures:

FIGS. 4a and 4b show a diagram.

DETAILED DESCRIPTION OF THE PREFERRED EMBODIMENTS

Figure 1:
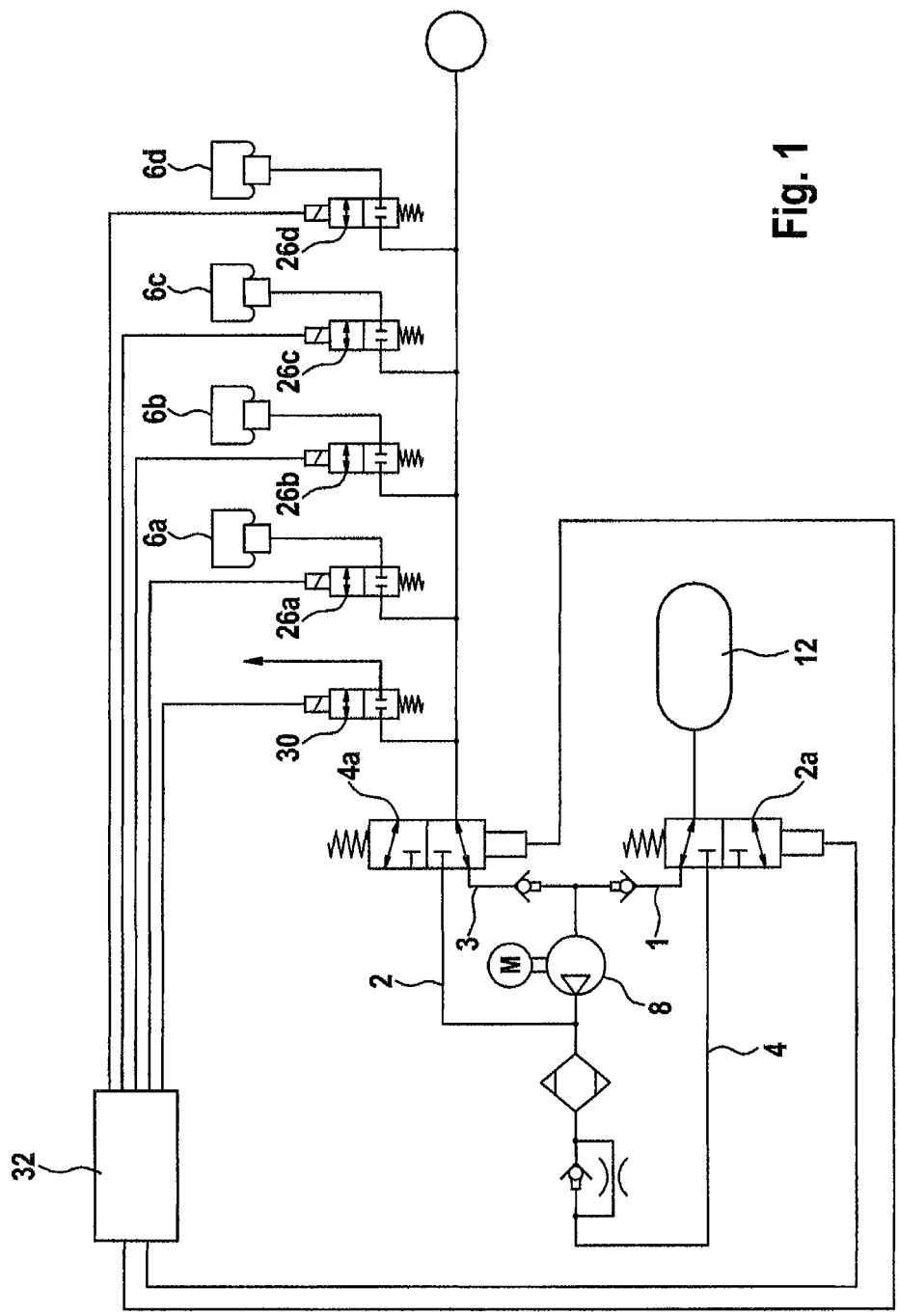
FIG. 1 shows a closed ride height control system for a motor vehicle in a schematic illustration.

FIG. 1 shows, in a schematic illustration, a closed ride height control system for a motor vehicle, which is described in detail in EP 1243447 A2 and will therefore only be explained briefly here. The closed ride height control system contains, in addition to other components, air springs 6a to 6d, a compressed air accumulator 12, compressed air lines 1 to 4 with switchable directional control valves 2a, 4a, 26a to 26d and 30, a compressor 8 and a control unit 32. The air springs 6a to 6d are filled or emptied using the closed ride height control system. In this context, filling the air springs 6a to 6d corresponds to a raising process of the vehicle body of the motor vehicle in which the ride height control system is installed, while emptying the air springs 6a to 6d corresponds to a lowering process of the vehicle body.

The air springs 6a to 6d are filled as follows: the switchable directional control valves 4a and 26a to 26d are activated by the control unit 32, with the result that the latter change over from the switched state shown in FIG. 1 into their other switched state. The motor M of the compressor is then actuated by the control unit 32, with the result that the latter starts to run. Compressed air is then transferred into the air springs 6a to 6d from the compressed air accumulator 12 via the compressed air line 1 in which the directional control valve 2a is located, and via the compressed air line 2 in which the switchable directional control valves 4a and 26a to 26d are located. Compressed air is transferred from the compressed air accumulator 12 into the air springs 6a to 6d basically until the control unit 32 detects that the vehicle body of the motor vehicle assumes the desired height. After this, the motor M of the compressor 8 and the switchable directional control valves 26a to 26d are no longer actuated, with the result that the compressor stops running and the directional control valves change again into the switched state shown in FIG. 1.

The air springs 6a to 6d are emptied as follows: first, the directional control valves 26a to 26d and 2a are actuated by the control unit 32, with the result that these valves change over from the state shown in FIG. 1 into the other switched state. After this, the motor M of the compressor 8 is actuated by the control unit 32, with the result that the motor M starts to run. Compressed air is then transferred into the compressed air accumulator 12 from the air springs 6a to 6d using the compressor 8, via the compressed air line 3 in which the directional control valves 26a to 26d and 4a are located, and via the compressed air line 4 in which the directional control valve 2a is located. The transfer of the compressed air from the air springs 6a to 6d takes place basically until the control unit 32 detects that the vehicle body has lowered to the desired height. As soon as the control unit 32 detects this, it no longer actuates the motor M of the compressor 8 and the switchable directional control valves 26a to 26d with the result that the compressor stops running and the directional control valves 26a to 26d change again into the switched state shown in FIG. 1. Alternatively it is possible for the air springs 6a to 6d to be emptied into the atmosphere in order to perform emptying or to lower the vehicle body. For this purpose, the control unit 32 actuates the switchable directional control valves 26a to 26d and 30, with the result that each air spring 6a to 6d can be emptied into the atmosphere via the respective directional control valve 26a to 26d and the switchable directional control valve 30. As soon as the control unit 32 detects that the vehicle body assumes the desired height, the directional control valves 26a to 26d and 30 are no longer actuated, with the result that they change over again into the switched state shown in FIG. 1.

Switch-off limiting values for specific operating parameters for the compressor 8 and for the switchable directional control valves 26a to 26d are stored in the control unit 32. A switch-off limiting value for the "compressor temperature" operating parameter and an additional switch-off limiting value for the "ambient temperature of the compressor" operating parameter are therefore stored in the control unit 32 for the compressor 8. A switch-off limiting value for the "switch-on period" is stored for the switchable directional control valves 26a to 26d in the control unit 32. The specified operating parameters are continuously monitored in the control unit 32. The compressor temperature and the ambient temperature of the compressor can be monitored, for example, with temperature sensors or with a temperature model in a manner known per se. If it is detected by the control unit 32 during the filling of the air springs 6a to 6d, i.e. during a raising process in the ride height control system, that at least one of the specified operating parameters reaches the switch-off limiting value provided for it, the raising process is aborted by the control unit 32. In contrast to this, upward transgression of the switch-off limiting values of the specified operating parameters is permitted in the case of lowering processes, with the result that a lowering process can always be completed (i.e. the lowering process is always continued until the vehicle body of the motor vehicle reaches the desired height). This ensures that the vehicle body can always be lowered to a height which is safe in terms of vehicle movement dynamics or into a low height which sufficiently allows for pedestrian protection.

Figure 2:
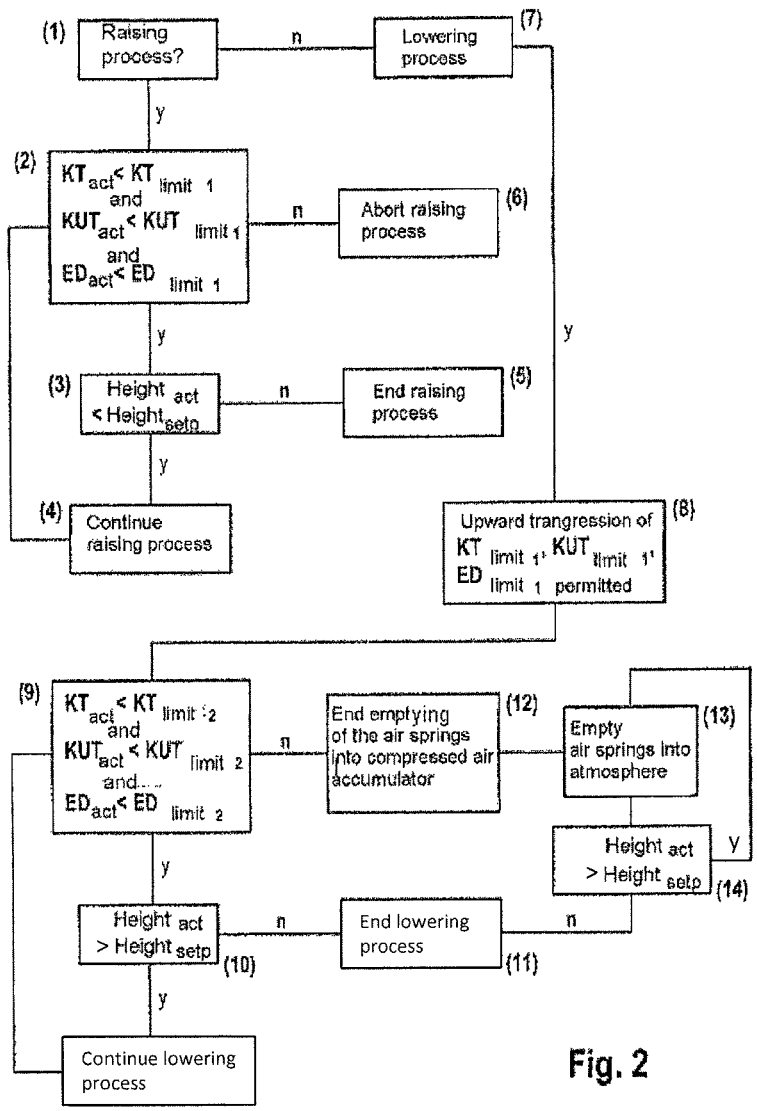
FIG. 2 shows a flowchart.

In conjunction with the flowchart shown in FIG. 2, the text which follows explains how the operating parameters are monitored individually in the control unit 32. In step 1, the control unit 32 checks whether a raising process is to be carried out. If this is the case, the control unit 32 initiates a raising process, as has been described in conjunction with FIG. 1. During the execution of the raising process, the operating parameters of the compressor temperature $KT_{act}$ and the compressor ambient temperature $KUT_{act}$ and the switch-on period of the switchable directional control valves 26a to 26d $ED_{act}$ are monitored continuously, i.e. it is continuously checked whether the operating parameters are lower than the associated switching off limiting values $KT_{limit1}$, $KTU_{limit1}$, $ED_{limit1}$. In addition, in the control unit 32 it is continuously monitored whether the actual height of the vehicle body $height_{act}$ is smaller than the setpoint value of the vehicle body $height_{setp}$ (see step 3). If this is the case, the raising process is continued, as is shown in step 4. Otherwise, the raising process is ended, since the vehicle body has reached the setpoint height (see step 5). If the continuous monitoring of the operating parameters reveals, however, that one of the operating parameters reaches the switching off limiting value $KT_{limit1}$ or $KUT_{limit1}$ or $ED_{limit1}$, the raising process is aborted (see step 6). In this case, the vehicle body is still below the desired setpoint height. The raising process is not continued again until the operating parameter whose switching off limiting value has been reached has dropped again below the switching off limiting value. In this context a switch-on limiting value which is lower than the switching off limiting value is preferably defined for every operating parameter, and continuation of the raising process is not permitted until the operating parameter reaches the switch-on limiting value. As a result, continuous resumption, followed by immediate repeated aborting of the raising process, is avoided.
Example: for the compressor temperature KT, the switch-off limiting value $KT_{limit1}$ and the switch-on limiting value $KT_{limit3}$ are defined in the control unit 32, where $KT_{limit3}<KT_{limit1}$. If the compressor temperature KT reaches the switch-off limiting value $KT_{limit1}$, the raising process is aborted in step 6. Continuation of the raising process is not permitted until the compressor has cooled to the switch-on limiting value $KT_{limit3}$.

If the control unit detects in step 1 that no raising process is to be carried out, the control unit 32 checks whether a lowering process is to be carried out (see step 7). If this is the case, a lowering process is initiated by the control unit 32, as has been explained in conjunction with FIG. 1. The above-mentioned operating parameters are also continuously monitored by the control unit 32 during the lowering process. However, during the lowering process the control unit 32 permits the respective switching off limiting values of the specified operating parameters to be exceeded (see step 8). According to a first exemplary embodiment of the invention, during a lowering process the control unit 32 always checks the actual height of the vehicle body $height_{act}$ to determine whether it is greater than the setpoint height of the vehicle body $height_{setp}$. As long as this is the case, the lowering process is continued. Otherwise, the lowering process is ended, since the vehicle body has reached its setpoint height. In this first exemplary embodiment of the invention, "desired upward transgression" of the operating parameters KT, KTU, ED is therefore permitted.

According to a second exemplary embodiment of the invention, during a lowering process the control unit 32 monitors the specified operating parameters and it is continuously checked whether the operating parameters are lower than associated maximum limiting values $KT_{limit2}$, $KUT_{limit2}$ and $ED_{limit2}$ which are higher than the first switch-off limiting values (i.e.: $KT_{limit2}>KT_{limit1}$, $KUT_{limit2}>KUT_{limit1}$ and $ED_{limit2}>ED_{limit1}$). As long as all the operating parameters are lower than the maximum limiting values, the lowering process is continued, wherein the actual height of the vehicle body is continuously compared with the setpoint height of the vehicle body (see step 10). The lowering process is ended when the actual height of the vehicle body corresponds to the desired setpoint height (see step 11).

However, if the control unit 32 detects in advance that at least one of the operating parameters of compressor temperature, compressor ambient temperature or switch-on period reaches the associated maximum limiting value, emptying of the air springs 6a to 6d into the compressed air accumulator 12 using the compressor 8 (see also FIG. 1 and the associated description of the figure) is ended. This means, in particular, that the compressor stops running. The lowering process is then aborted and the vehicle body of the motor vehicle is located above the desired setpoint height.

In order to continue and rapidly end the lowering process, it is possible in this case to empty the air springs 6a to 6d directly into the atmosphere as has already been described in conjunction with FIG. 1. Emptying of the air springs into the atmosphere takes place until the actual height of the vehicle body has reached the desired setpoint height (see steps 13 and 14).

Continuation of the lowering process by emptying the air springs 6a to 6d into the compressed air accumulator 12 using the compressor 8 (see FIG. 1) is not permitted again until the operating parameter whose maximum limiting value has been exceeded has undershot the switching off limiting value again.

Figure 3A:
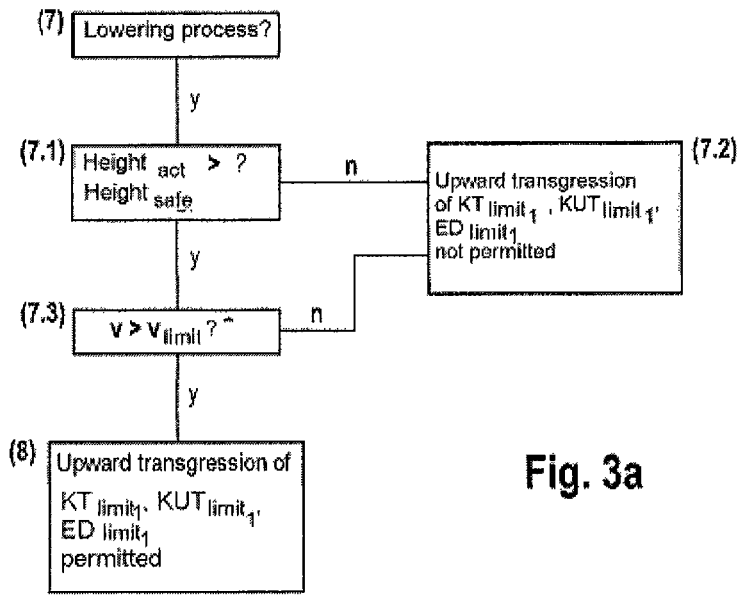
FIGS. 3a and 3b show a flow chart.

FIG. 3a shows a diagram of the initiation of a lowering process. If it is detected in the control unit 32 that a lowering process is to be initiated, it is firstly checked in the control unit whether the actual height $height_{act}$ of the motor vehicle body is greater than a safety height $height_{safe}$ which is defined in the control unit 32. If the checking in the control unit 32 reveals that the actual height is less than or equal to the safety height, upward transgression of the switch-off limiting values of the operating parameters is not permitted (see step 7.2). If the vehicle body is, however, at an actual height which is greater than the safety height, in the next step it is checked in the control unit 32 whether velocity v of the motor vehicle is higher than a limiting velocity $v_{limit}$ defined in the control unit 32. If this is not the case, upward transgression of the switch-off limiting values of the operating parameters is not permitted in the case of a lowering process (see step 7.2). If, on the other hand, the vehicle velocity v is higher than the limiting velocity $v_{limit}$, upward transgression of the switch-off limiting values of the operating parameters is permitted (see step 8), and in this case the lowering process is continued for as long as has been described in conjunction with FIG. 2 (see steps 8 to 14 in FIG. 2).

Figure 3B:
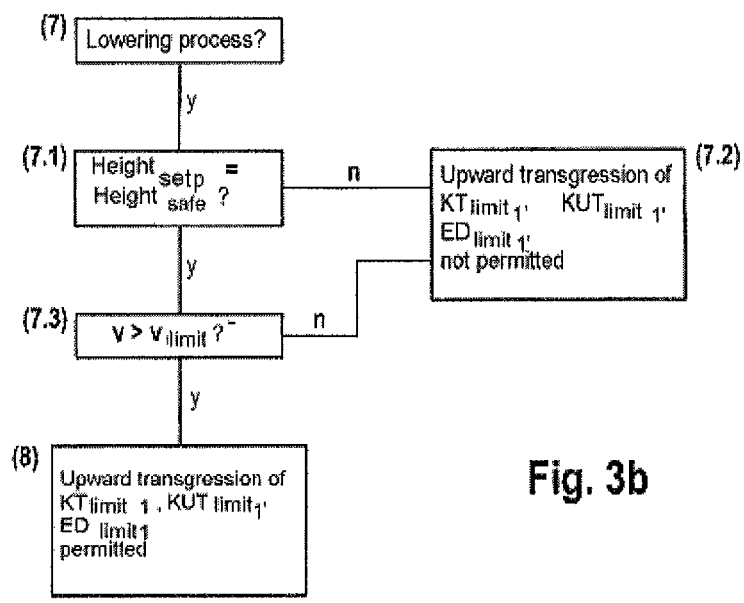

The flowchart in FIG. 3b corresponds largely to the flowchart shown in FIG. 3a. The only difference is merely to be seen in the fact that in step 7.1 it is checked whether the setpoint height $height_{setp}$ which is aimed at a lowering process corresponds to the safety height $height_{safe}$. Upward transgression of the switch-off limiting values of the operating parameters according to step 8 is permitted only when this is the case and if the velocity v of the vehicle is additionally higher than the velocity $v_{limit}$ defined in the control unit 32 (see step 7.3). Otherwise, upward transgression of the switch-off limiting values of the operating parameters is not permitted by the control unit 32 (see step 7.2).

In conjunction with the diagrams according to FIGS. 4*a* and 4*b*, the following text explains how the switch-on period of the switchable directional control valves 26*a* to 26*d* is monitored. In FIGS. 4*a* and 4*b*, the time t is plotted against the signal S. For the monitoring of the switch-on period, a time interval of a specific length, for example 10 seconds, is defined in the control unit 32 (see FIG. 1). In the control unit 32, the time period for each switchable directional control valve 26*a* to 26*d* during which it was switched on in the last 10 preceding seconds (that is to say as long as the signal "1" is present) is monitored. In addition, a switch-off limiting value for the switch-on period of one of each switchable directional control valve is defined in the control unit 32. It is possible to define as a switch-off limiting value that, for example, in the last 10 seconds a switchable directional control valve can be switched on for 5 seconds at maximum. If the switch-off limiting value is reached for a switchable directional control valve, it is basically no longer actuated by the control unit 32, with the result that it changes into its switched-off state (see in this respect also the description relating to FIG. 1). Renewed switching on of the directional control valve after the switch-off limiting value has been reached is not permitted again until the switch-on period has dropped again to a defined switch-on limiting value of, for example, 2 seconds in the preceding 10 seconds.

Example according to FIG. 4*a*: after 10 seconds it is detected in the control unit 32 that in the preceding 10 seconds a switchable directional control valve was switched on for 4 seconds (specifically from the time period of 2 seconds to 6 seconds). Within these 4 seconds, a control process was ended, with the result that premature switching off of the switchable directional control valve was not necessary. When t=12 seconds, a request for a lowering process occurs. Before the initiation of the lowering process, the length of time for which the switchable directional control valve was switched on in the last 10 seconds (that is to say in the time period from 2 to 12 seconds) is firstly checked in the control unit 32. In the control unit 32 it is detected that during the last 10 seconds the switchable directional control valve was switched on for 4 seconds (specifically in the time period from 2 to 6 seconds). Since this time period of 4 seconds is shorter than the defined switch-off limit for the switch-on period (specifically 5 seconds), switching on of the valve is permitted at the time t=12 seconds. In the example shown, the raising process is carried out from t=12 seconds to t=17 seconds, that is to say for a total of 5 seconds. If the raising process is then not yet completed—which is assumed here—the raising process is aborted prematurely after t=17 seconds.

After t=17 seconds, renewed switching on of the switchable directional control valve is not permitted again until the time t=25 seconds, since it is only at this time that the switch-on period of the directional control valve reaches the switch-on limiting value of 2 seconds in the last 10 seconds. The raising process is therefore continued at t=25 seconds and in the example shown it lasts until t=28 seconds. After this, the raising process in the example shown is completed, i.e. the vehicle body has reached the desired setpoint height.

In the diagram according to FIG. 4*b*, a switchable directional control valve is switched on in the time period from t=2 seconds to t=5 seconds and during this time a raising process may take place and be completed. At the time t=10 seconds, a request for a lowering process is issued to the control unit 32 (see FIG. 1). The control unit 32 carries out the lowering process by switching on, inter alia, the switchable directional control valve.

At the time t=12 seconds, the switch-on period of the valve in the last preceding 10 seconds is 5 seconds. In the case of a raising process, the switch-on valve would therefore have to be switched off at the time t=12 seconds, since the switch-off limiting value of 5 seconds for the switch-on period of the switchable directional control valve is reached. It would then no longer be possible to fill an air spring 6*a* to 6*d* (see FIG. 1) further. However, since the process is a lowering process, upward transgression of the switch-off limiting value for the switch-on period is permitted and the lowering process is continued further. 8 seconds may be defined as the maximum limiting value for the switch-on period for the switchable directional control valve during the last 10 seconds, i.e. the switchable directional control valve is switched off when it was switched on for 8 seconds in the preceding 10 seconds. This is the case at the time t=18 seconds i.e. at this time the lowering process is prematurely aborted. Resumption of the lowering process is then permitted when the switchable directional control valve was switched on for 5 seconds at maximum in the last preceding 10 seconds, that is to say at the time t=23 seconds in the present example. The lowering process is then continued to the time t=27 seconds and may be assumed to be then completed in the selected example. At this time the vehicle body of the motor vehicle is then at the desired setpoint height.

LIST OF REFERENCE NUMERALS

1 Compressed air line
2 Compressed air line
3 Compressed air line
4 Compressed air line
2*a* Switchable directional control valve
4*a* Switchable directional control valve
6*a*-6*d* Air spring
8 Compressor
12 Compressed air accumulator
26*a*-26*d* Switchable directional control valve
30 Switchable directional control valve
32 Control unit

The invention claimed is:

1. A ride height control system for a motor vehicle comprising:
air springs,
at least one compressed air accumulator,
compressed air lines with switchable directional control valves for either closing or opening the compressed air lines,
a compressor for transferring compressed air from the compressed air accumulator into the air springs via compressed air lines for a raising process and for transferring compressed air from the air springs into the compressed air accumulator via compressed air lines for a lowering process,
a control unit in which a switch-off limiting value for at least one operating parameter of at least one component of the ride height control system is monitored, wherein the activation of the component is prohibited or aborted when the switch-off limiting value is reached,
wherein, in the raising process, the activation of the component is prohibited or aborted when the switch-off limiting value is reached, and upward transgression of the switch-off limiting value of the operating parameter is permitted in the case of the lowering process.

2. The ride height control system as claimed in claim 1, wherein the switchable directional control valves and the compressor are each assigned at least one operating parameter, and upward transgression of the respective switch-off limiting value of all the operating parameters is permitted in the case of the lowering process.

3. The ride height control system as claimed in claim 2, wherein each switchable directional control valve is assigned a switch-on period as an operating parameter.

4. The ride height control system as claimed in claim 3, wherein the switch-on period of a switchable directional control valve is monitored in the control unit as follows:
   a time interval of a specific length is defined,
   the switch-on period during which the switchable directional control valve is switched on in the preceding time interval is monitored,
   the switchable directional control valve is switched off when the switch-on period reaches a defined switch-off limiting value within the last preceding time interval,
   renewed switching on of the directional control valve is not permitted again until the switch-on period in the proceeding time interval reaches a switch-on limiting value which is lower than the switch-off limiting value,
   wherein during the lowering process the control unit permits the switch-on period in the last preceding time interval to be exceeded, and in order to initiate the lowering process after the directional control valve has switched off, the control unit permits renewed switching on of the directional control valve even when the switch-on limiting value has not yet been reached.

5. The ride height control system as claimed in claim 1, wherein the compressor is assigned the compressor temperature as an operating parameter.

6. The ride height control system as claimed in claim 1, wherein the compressor is assigned the ambient temperature of the compressor as an operating parameter.

7. The ride height control system as claimed in claim 1, wherein a safety height for a body of the motor vehicle is defined in the control unit, and wherein during the lowering process upward transgression of the respective switch-off limiting value of the operating parameters is permitted only when a current height of the vehicle body is above the safety height.

8. The ride height control system as claimed in claim 7, wherein upper transgression of the respective switch-off limiting value of the operating parameters is permitted only when the safety height of the vehicle body is to be set with a lowering process.

9. The ride height control system as claimed in claim 1, wherein a limiting speed for the motor vehicle is defined in the control unit, and wherein upward transgression of the respective switch-off limiting value of the operating parameters is permitted only when a current speed of the motor vehicle exceeds the limiting speed.

10. The ride height control system as claimed in claim 1, wherein in addition to the associated switch-off limiting value, a maximum limiting value, which is higher than the respective switch-off limiting value, is defined for each operating parameter, and wherein the lowering process is interrupted if the maximum limiting value of at least one operating parameter is reached.

11. The ride height control system as claimed in claim 10, wherein a renewed lowering process or continuation of an aborted lowering process is not permitted again until all the operating parameters have undershot the switch-off limiting value again.

12. The ride height control system as claimed in claim 1, wherein the air springs are emptied into the atmosphere via an atmospheric outlet when the lowering process is interrupted.

* * * * *